United States Patent
Witte

(10) Patent No.: US 11,276,175 B2
(45) Date of Patent: Mar. 15, 2022

(54) DETERMINING A CLINICAL TARGET VOLUME

(71) Applicant: Brainlab AG, Munich (DE)

(72) Inventor: Jens Witte, Munich (DE)

(73) Assignee: BRAINLAB AG, Munich (DE)

(*) Notice: Subject to any disclaimer, the term of this patent is extended or adjusted under 35 U.S.C. 154(b) by 143 days.

(21) Appl. No.: 16/604,479

(22) PCT Filed: May 18, 2017

(86) PCT No.: PCT/EP2017/061985
§ 371 (c)(1),
(2) Date: Oct. 10, 2019

(87) PCT Pub. No.: WO2018/210422
PCT Pub. Date: Nov. 22, 2018

(65) Prior Publication Data
US 2020/0126235 A1 Apr. 23, 2020

(51) Int. Cl.
*G06T 7/11* (2017.01)
*G06T 7/136* (2017.01)
*G06T 7/00* (2017.01)

(52) U.S. Cl.
CPC .............. *G06T 7/11* (2017.01); *G06T 7/0012* (2013.01); *G06T 7/136* (2017.01);
(Continued)

(58) Field of Classification Search
CPC ......... G06T 7/11; G06T 7/136; G06T 7/0012; G06T 2207/10092; G06T 2207/10104;
(Continued)

(56) References Cited

U.S. PATENT DOCUMENTS

| 6,112,112 A | 8/2000 | Gilhuijs et al. |
| 2009/0226060 A1* | 9/2009 | Gering ...................... G06T 7/11 382/128 |
| 2009/0270712 A1 | 10/2009 | Raghavan et al. |

| 2011/0194742 A1 | 8/2011 | Buelow et al. |

(Continued)

FOREIGN PATENT DOCUMENTS

| WO | WO2014094376 A1 | 6/2014 |
| WO | WO20180210422 A1 | 11/2018 |

OTHER PUBLICATIONS

Jena et al., "Diffusion Tensor Imaging: Possible Implications for Radiotherapy Treatment Planning of Patients with High-grade Glioma", Clinical Onco, W.B. Saunders, Amsterdam, NL, vol. 17, No. 8, Dec. 1, 2005 (Dec. 1, 2005), pp. 581-590.

(Continued)

*Primary Examiner* — Kim Y Vu
*Assistant Examiner* — Molly Delaney
(74) *Attorney, Agent, or Firm* — Middleton Reutlinger

(57) ABSTRACT

Disclosed is a medical image data processing method for determining a clinical target volume for a medical treatment, wherein the method comprises executing, on at least one processor (3) of at least one computer (2), steps of: a) acquiring (S1) first image data describing at least one image of an anatomical structure of a patient; b) acquiring (S2) second image data describing an indicator for a preferred spreading direction or probability distribution of at least one target cell; c) determining (S3) registration data describing a registration of the first image data to the second image data by performing a co-registration between the first image data and the second image data using a registration algorithm; d) determining (S4) gross target region data describing a target region in the at least one image of the anatomical structure based on the first image data; e) determining (S5) margin region data describing a margin around the target region based on the gross target region data; f) determining (S6) clinical target volume data describing a volume in the anatomical structure for the medical treatment based on the registration data, the gross target region data and the margin region data.

10 Claims, 3 Drawing Sheets

(52) U.S. Cl.
CPC ............... *G06T 2207/10092* (2013.01); *G06T 2207/10104* (2013.01); *G06T 2207/10108* (2013.01); *G06T 2207/20128* (2013.01); *G06T 2207/30016* (2013.01); *G06T 2207/30096* (2013.01)

(58) Field of Classification Search
CPC . G06T 2207/10108; G06T 2207/20128; G06T 2207/30016; G06T 2207/30096
See application file for complete search history.

(56) References Cited

U.S. PATENT DOCUMENTS

| | | | | |
|---|---|---|---|---|
| 2011/0267343 | A1* | 11/2011 | Foshee | A61N 5/103 345/419 |
| 2016/0310761 | A1* | 10/2016 | Li | A61B 5/055 |
| 2017/0120041 | A1* | 5/2017 | Wenger | A61B 5/0042 |
| 2017/0259083 | A1* | 9/2017 | Nakatsugawa | A61N 5/1049 |
| 2018/0304099 | A1* | 10/2018 | Li | G06T 7/11 |
| 2018/0326223 | A1* | 11/2018 | Willcut | A61N 5/107 |
| 2019/0046813 | A1* | 2/2019 | Zhou | G16H 50/70 |
| 2019/0117956 | A1* | 4/2019 | Wenger | A61B 5/0042 |

OTHER PUBLICATIONS

Berberat Jatta et al., "Diffusion tensor imaging for target volume definition in glioblastoma multiforme", May 14, 2014 (May 14, 2014), vol. 190, No. 10, pp. 939-943.

Konukoglu et al., "Extrapolating glioma invasion margin in brain magnetic resonance images: Suggesting new irradiation margins", Apr. 1, 2010 (Apr. 1, 2010), vol. 14, No. 2, pp. 111-125.

Cox et al., "International Spine Radiosurgery Consortium consensus guidelines for target volume definition in spinal stereotactic radiosurgery." https://www.ncbi.nlm.nih.gov/pubmed/22608954 Abstract only, Aug. 2012.

Farace et al., "Clinical target volume delineation in glioblastomas: per-operative versus post-operative/pre-radiotherapy MRI" https://www.ncbi.nlm.nih.gov/pubmed/21045069 Abstract only, Mar. 2011.

Niyazi et al., "ESTRO-ACROP guideline target delineation of glioblastomas" https://www.ncbi.nlm.nih.gov/pubmed/26777122 Abstract only, Jan. 2016.

Poortmans et al., "Guideline for target volume definition in post-operative radiotherapy for prostate cancer, on behalf of the EORTC Radiation Oncology Group" https://www.thegreenjournal.com/article/S0167-8140(07)00355-6/fulltext Abstract only, Aug. 2007.

"Quality Guidelines for Volume Delineation in Radiation Oncology" The Royal Australian and New Zealand College of Radiologists. Oct. 23, 2015, pp. 1-18.

Unkelbach et al., "Radiotherapy planning for glioblastoma based on a tumor growth model: improving target volume delineation" https://hal.inria.fr/hal-00917869.

International Search Report and Written Opinion issued in Application No. PCT/EP2017/061985 dated Aug. 31, 2017; 11 Pages.

\* cited by examiner

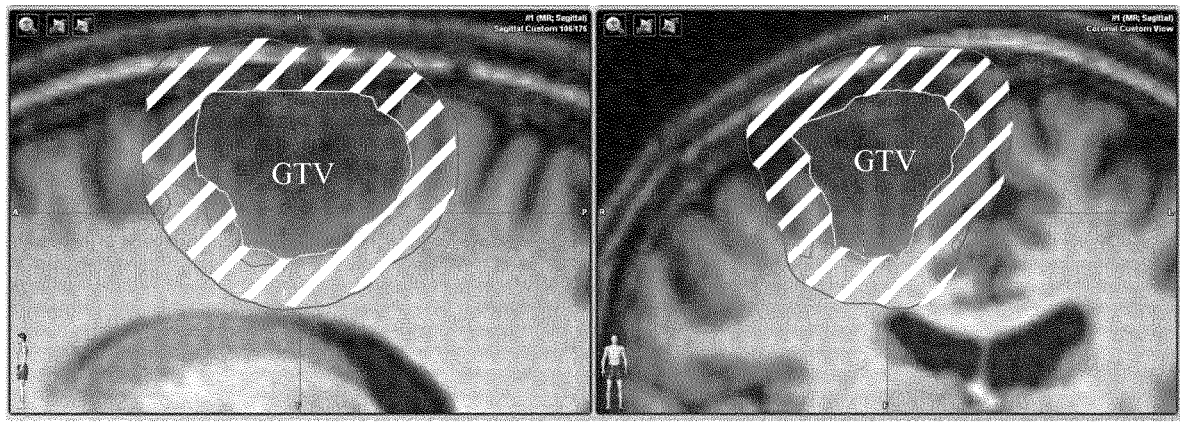
Fig. 3a                               Fig. 3b
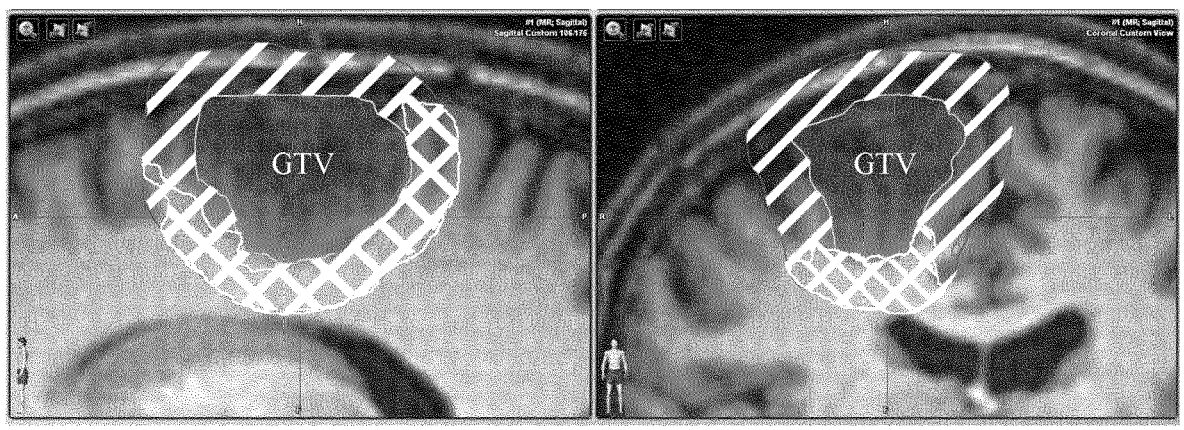
Fig. 4a                               Fig. 4b
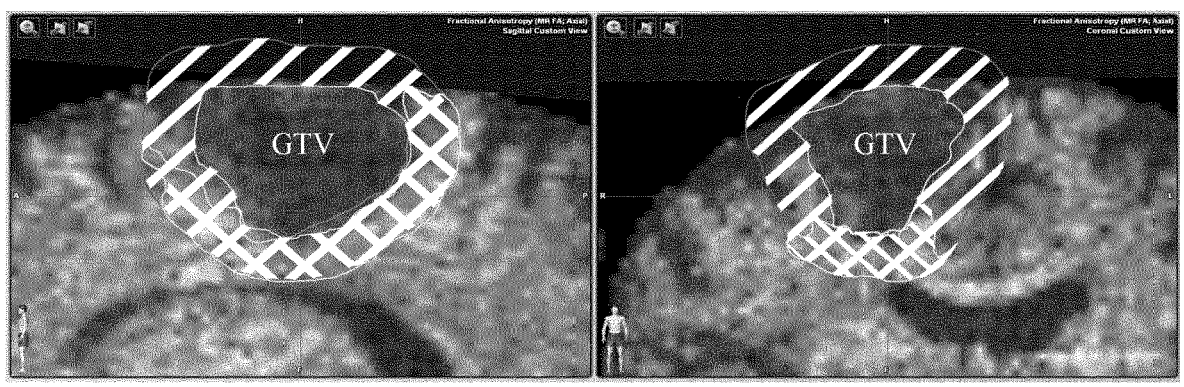
Fig. 5a                               Fig. 5b

DETERMINING A CLINICAL TARGET VOLUME

The present invention relates to a medical image data processing method for determining a clinical target volume for a medical treatment, a corresponding computer program, a non-transitory program storage medium storing such a program and a computer for executing the program, as well as a system for determining a clinical target volume for a medical treatment.

TECHNICAL BACKGROUND

For planning and performing medical treatments, in particular radiotherapy treatments, different types of volumes to be treated may be defined.

For example, a treatment volume may be defined by the position and extent of a gross tumor, i.e. what can be seen, palpated or imaged by diagnostic imaging methods like computed tomography (CT) or magnetic resonance imaging (MRI). Such a volume is also referred to as the gross tumor volume (GTV).

However, for a successful outcome after radiation treatment, every single tumor cell should be eradicated, including those which have invaded beyond the visible disease. Such a volume comprises the gross tumor volume plus a margin for sub-clinical disease spread which cannot be fully visualized by standard imaging methods. Such a volume is also referred to as the clinical target volume (CTV). Today several guidelines exist to define a CTV margin, e.g. a geometrical guideline like a spherical 5 mm extension of the GTV.

However, the tumor cells may actually spread outside a predefined margin, sometimes for a surprisingly large distance. Accordingly, the actual extent of a tumor assessed by current diagnostic cancer imaging and the final definition of a target volume, for example for radiotherapy planning or surgical resection, may differ significantly. The same applies for treating other diseased cells, for example infected cells.

In particular, applying generic safety margins to the gross tumor volume (GTV) for defining the clinical target volume (CTV) may lead to irradiation of tissue that potentially does not need to be treated. Furthermore, a potential under dosage of areas that do have a high risk of tumor cell spread may occur.

Determining a clinical target volume which represents the actual spreading of diseased cells more accurately is of fundamental importance for the success of a medical treatment. By preventing spreading of diseased cells, for example tumor cells, the survival rates may be improved. Furthermore, by determining an optimized clinical target volume the risk of treating healthy cells, for example by a radiotherapy treatment, may be reduced.

The present invention allows for determining an optimized clinical target volume. In particular, the determined clinical target volume considers spreading of diseased cells more accurately.

Aspects of the present invention, examples and exemplary steps and their embodiments are disclosed in the following. Different exemplary features of the invention can be combined in accordance with the invention wherever technically expedient and feasible.

EXEMPLARY SHORT DESCRIPTION OF THE PRESENT INVENTION

In the following, a short description of the specific features of the present invention is given which shall not be understood to limit the invention only to the features or a combination of the features described in this section.

The disclosed method encompasses acquiring first image data describing at least one image of an anatomical structure or body region of a patient. Moreover, second image data describing an indicator for a preferred spreading direction or probability distribution of a diseased cell is acquired. The second image data represents information about metabolic, molecular, physical or biological parameters correlating with spreading of diseased cells. The first image data and the second image data is co-registered by performing a co-registration. A target region is defined in the at least one image of the anatomical structure by means of segmentation. A safety margin is defined around the target region to be treated, for example a tumor. Based on the information about metabolic, molecular, physical or biological parameters correlating with spreading of diseased cells underlying the co-registered data an optimized clinical target volume is determined.

GENERAL DESCRIPTION OF THE PRESENT INVENTION

In this section, a description of the general features of the present invention is given for example by referring to possible embodiments of the invention.

The method, the program and the system are defined by the appended independent claims. Advantages, advantageous features, advantageous embodiments and advantageous aspects of the present invention are disclosed in the following and contained in the subject-matter of the dependent claims. Different advantageous features can be combined in accordance with the invention wherever technically expedient and feasible. Specifically, a feature of one embodiment which has the same or a similar function to another feature of another embodiment can be exchanged with said other feature, and a feature of one embodiment which adds an additional function to another embodiment can in particular be added to said other embodiment.

The disclosed method provides, in a first aspect, a medical image data processing method for determining a clinical target volume (CTV) for a medical treatment. In one example, the medical treatment is a radiation treatment (for example, a radiotherapy treatment).

The method comprises executing, on at least one processor of at least one computer, the following exemplary steps which are executed by the at least one processor.

In an (for example first) exemplary step, first image data describing at least one image of an anatomical structure or body region of a patient is acquired. The first image data may be acquired by means of diagnostic imaging modalities, for example magnetic resonance imaging (MRI) or computed tomography (CT).

The first image data may describe structural information of an anatomical structure of a patient. In one example, the first image data describes at least part of a patient's brain.

In one embodiment, the first image data comprises color values, which define the appearance and/or the information content of the image. In one example, the color values are multicolor color values (which are defined for example in the RGB color space). In another example, the color values are greyscale color values.

In one example, the first image data allows for a differentiation between different parts (for example, different types of tissue) of the anatomical structure. Different types of tissue may be characterized by associated different color values.

In an (for example second) exemplary step, second image data is acquired. The second image data describes an indicator for a preferred spreading direction or probability distribution (of a position) of at least one target cell. The target cell may be a diseased cell, for example an infected cell. In one example, the target cell is a tumor cell.

The preferred spreading direction may be a direction in which a target cell is preferably spreading (for example, moving) within an anatomical structure. The preferred spreading direction may be associated, for example, with the direction of fibers (for example, of a brain).

The probability distribution may describe a probability for the presence of a target cell versus the position within an anatomical structure. In one example the probability distribution is a probability distribution of a position of a target cell within an anatomical structure.

In one embodiment, the second image data is acquired by means of diffusion tensor imaging (DTI), diffusion kurtosis imaging (DKI), diffusion weighted imaging (DWI), diffusion spectrum imaging (DSI) or perfusion weighted imaging (PWI). In one example, the second image data is acquired by means of nuclear imaging methods, for example positron emission tomography (PET) or single-photon emission computed tomography (SPECT).

The first image data and the second image data may be 2D image data or 3D image data. The first image data and/or the second may have been generated before the disclosed method is executed. Alternatively, generation of the first image data and/or the second image data may be implemented as a step of the disclosed method.

In an (for example third) exemplary step, registration data describing a registration of the first image data to the second image data by performing a co-registration between the first image data and the second image data using a registration algorithm is determined. The registration (co-registration) may be a rigid registration or an elastic registration. In the following the term "registration" (co-registration) is used synonymously to the term "fusion".

In an (for example fourth) exemplary step, gross target region data describing a target region in the at least one image of the anatomical structure is determined based on the first image data. The target region may be a region of interest (ROI), for example, at least part of a tumor. In one embodiment the target region comprises the position of at least one tumor cell or at least one infected cell.

In one example, determining the gross target region data comprises segmentation of the first image data, in particular manual, semi-automatic or automatic segmentation. Manual, semi-automatic or automatic contouring techniques may be applied to define a target region in the at least one image of the anatomical structure. By determining a gross target region (described by the target region data) in at least one image of the anatomical structure a gross target volume (GTV) may be determined. The at least one image may comprise an axial, sagittal or coronal reconstruction plane through the anatomical structure. In one example, a gross target volume (GTV) may be determined based on the gross target region (described by the target region data) for at least two planes (for example, orthogonal planes) through the anatomical structure.

In an (for example fifth) exemplary step, margin region data describing a margin around the target region is determined based on the gross target region data. In one embodiment, determining margin region data comprises computing safety margin distance data describing a distance from a specified point of the target region by means of a distance function. The specified point may be a point comprised in the outer contour of the target region. For example, the specified point may be located on the outer contour of the target region.

In one embodiment, the distance function may describe a distance from a point on the outer contour of the target region. The distance may range from 1 mm to 50 mm, in particular from 4 mm to 10 mm. By means of the distance function a safety margin may be determined around the target region. Accordingly, a safety margin volume may be determined around a target volume. In the following, the target region plus the safety margin is also referred to as the safety margin region of interest (safety margin ROI).

In an (for example sixth) exemplary step, clinical target volume data describing a volume in the anatomical structure for the medical treatment is determined based on the registration data, the gross target region data and the margin region data. By considering the second image data describing an indicator for a preferred spreading direction or probability distribution (of a position) of at least one target cell an optimized target volume may be determined.

In one embodiment, the method comprises executing, on the at least one processor of the at least one computer, a step of acquiring threshold data describing at least one threshold for a value described by the second image data. Determining the clinical target volume data may be further based on the threshold data. In one example, the at least one threshold may be pre-defined (for example, set manually). Accordingly, the threshold value may be defined (for example, pre-defined) by a user.

In one example, the second image data provides a visual representation (for example, a black/white, greyscale or color pixel image) of (abstract) correlated tissue values associated with a metabolic, physical or biological parameter of tissue within the anatomical structure (for example, a fiber of a brain). In other words, the second image data may describe correlated tissue values. For example, each pixel or voxel described by the second image data may be associated with a correlated tissue value.

The correlated tissue values may provide an indicator for a preferred spreading direction or probability distribution of at least one target cell. For example, tumor cells (or other diseased cells) spread anisotropically rather than isotropically through an anatomical structure. For example, tumor cells (or other diseased cells) travel along brain fiber tracts using the diffusion characteristics of these tissue cells or they connect to certain metabolic processes within neighboring cells. These cell spreading characteristics may be quantified, for example, by means of the correlated tissue values described above. Accordingly, these cell spreading characteristics may be considered when determining the (optimized) clinical target volume according to the disclosed method. The obtained (optimized) clinical target volume therefore considers the most likelihood of tumor cell presence or spreading (or the presence or spreading of other diseased cells).

In one embodiment, the correlated tissue values are obtained by means of diffusion tensor imaging (DTI), diffusion kurtosis imaging (DKI), diffusion weighted imaging (DWI), diffusion spectrum imaging (DSI) or perfusion weighted imaging (PWI). The correlated tissue value may be a fractional anisotropy value (FA), an apparent diffusion coefficient (ADC), a diffusion coefficient (DWI) or a permeability coefficient. The correlated tissue values may, for example, be stored in a diffusion tensor matrix which can be read out for each pixel (for example, 2D pixel) or voxel (for example, 3D voxel) position. The threshold data may be acquired based on the diffusion tensor matrix. For example, a threshold of larger than 0.25 FA may be predefined or, for example, may be set manually.

Thresholds defined by the user for values described by the second image data associated with a metabolic or biological process or a physical parameter, for example a fractional anisotropy value (FA), an apparent diffusion coefficient (ADC), a diffusion coefficient (DWI) or a permeability coefficient, all together or each for itself representing information of potentially preferred directions for cell spreading may serve as a seed to automatically include pixels or voxels within the target region plus the margin. All pixels or voxels within the defined seed threshold range located within the target region plus margin may be used for determining the (optimized) clinical target volume. For example, the user may define a diffusion tensor threshold of larger than 0.25 FA that should be used to select pixels or voxels within an, for example, Euclidean distance of 20 millimeters added to the GTV. A respective (optimized) clinical target volume may be generated automatically.

By underlying physical, chemical, metabolic or biological characteristics of the tissue, that, for example, enable the tumor cells to spread outside the visible tumor boarders into neighboring tissue or into a preferred anatomical direction, by means of the second image data, an optimized (for example, patient specific) clinical target volume may be determined.

In one embodiment, the threshold data may be provided by or stored in a template. In one example the margin region data may be stored in a template. All settings for determining the safety margin ROI and/or the (optimized) clinical target volume may be provided by or saved in at least one template. The user may select a specific template regarding the threshold data (for example, specific to a certain kind of tumor or specific to a certain kind of tissue) and specify the target region, for example by means of segmentation of the first image data. In one example, the target region may be selected manually, for example by marking or surrounding a specific part of the image described by the first image data. The (optimized) clinical target volume may then be determined automatically.

In one embodiment, the method comprises executing, on the at least one processor of the at least one computer, a step of acquiring atlas data describing a (image-based) model of the anatomical structure. In one example, the atlas data comprises the second image data and/or threshold data describing at least one threshold for a value described by the second image data. For example, the atlas data comprises information about the identity (i.e. anatomical classification) of certain parts of the image-based model. By matching the atlas data to the image data (first image data and/or second image data) the identity of anatomical structures described by the image data corresponding to those described by the atlas data can be determined.

In a second aspect, the invention is directed to a computer program which, when running on at least one processor (for example, a processor) of at least one computer (for example, a computer) or when loaded into at least one memory (for example, a memory) of at least one computer (for example, a computer), causes the at least one computer to perform the above-described method according to the first aspect and/or to a (physical, for example electrical, for example technically generated) signal wave, for example a digital signal wave, carrying information which represents the program, for example the aforementioned program, which for example comprises code means which are adapted to perform any or all of the method steps described herein.

In a third aspect, the invention is directed to a non-transitory computer-readable program storage medium on which the program according to the second aspect is stored.

In a fourth aspect, the invention is directed to at least one computer (for example, a computer), comprising at least one processor (for example, a processor) and at least one memory (for example, a memory), wherein the program according to the second aspect is running on the at least one processor or is loaded into the at least one memory, or wherein the at least one computer comprises the program storage medium according to the third aspect.

In a fifth aspect, the invention is directed to system for determining a clinical target volume for a medical treatment, the system comprising:

a) at least one medical imaging device for acquiring image data; and b) the at least one computer according to the according to the fourth aspect, wherein the at least one computer is operably coupled to the at least one medical imaging device for acquiring, from the at least one medical imaging device, the first image data and/or the second image data.

It is within the scope of the present invention to combine one or more features of one or more embodiments or aspects of the invention in order to form a new embodiment wherever this is technically expedient and/or feasible. Specifically, a feature of one embodiment which has the same or a similar function to another feature of another embodiment can be exchanged with said other feature, and a feature of one embodiment which adds an additional function to another embodiment can for example be added to said other embodiment.

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable, for example handheld, device such as a smart phone or personal digital assistant or digital media player.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing the data by means of a computer and for example within the framework of the method in accordance with the invention. The meaning of "acquiring data" also for example encompasses the scenario in which the data are received or retrieved by the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

The n-dimensional image of a body is registered when the spatial location of each point of an actual object within a space, for example a body part in an operating theatre, is assigned an image data point of an image (CT, MR, etc.) stored in a system.

Image registration is the process of transforming different sets of data into one co-ordinate system. The data can be multiple photographs and/or data from different sensors, different times or different viewpoints. It is used in computer vision, medical imaging and in compiling and analysing images and data from satellites. Registration is necessary in order to be able to compare or integrate the data obtained from these different measurements.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The information on the imaging geometry preferably comprises information which allows the analysis image (x-ray image) to be calculated, given a known relative position between the imaging geometry analysis apparatus and the analysis object (anatomical body part) to be analysed by x-ray radiation, if the analysis object which is to be analysed is known, wherein "known" means that the spatial geometry (size and shape) of the analysis object is known. This means for example that three-dimensional, "spatially resolved" information concerning the interaction between the analysis object (anatomical body part) and the analysis radiation (x-ray radiation) is known, wherein "interaction" means for example that the analysis radiation is blocked or partially or completely allowed to pass by the analysis object. The location and in particular orientation of the imaging geometry is for example defined by the position of the x-ray device, for example by the position of the x-ray source and the x-ray detector and/or for example by the position of the multiplicity (manifold) of x-ray beams which pass through the analysis object and are detected by the x-ray detector. The imaging geometry for example describes the position (i.e. the location and in particular the orientation) and the shape (for example, a conical shape exhibiting a specific angle of inclination) of said multiplicity (manifold). The position can for example be represented by the position of an x-ray beam which passes through the centre of said multiplicity or by the position of a geometric object (such as a truncated cone) which represents the multiplicity (manifold) of x-ray beams. Information concerning the above-mentioned interaction is preferably known in three dimensions, for example from a three-dimensional CT, and describes the interaction in a spatially resolved way for points and/or regions of the analysis object, for example for all of the points and/or regions of the analysis object. Knowledge of the imaging geometry for example allows the location of a source of the radiation (for example, an x-ray source) to be calculated relative to an image plane (for example, the plane of an x-ray detector). With respect to the connection between three-dimensional analysis objects and two-dimensional analysis images as defined by the imaging geometry, reference is made for example to the following publications:
1. "An Efficient and Accurate Camera Calibration Technique for 3D Machine Vision", Roger Y. Tsai, Proceedings of the IEEE Conference on Computer Vision and Pattern Recognition. Miami Beach, Fla., 1986, pages 364-374
2. "A Versatile Camera Calibration Technique for High-Accuracy 3D Machine Vision Metrology Using Off-the-Shelf TV Cameras and Lenses", Roger Y. Tsai, IEEE Journal of Robotics and Automation, Volume RA-3, No. 4, August 1987, pages 323-344.
3. "Fluoroscopic X-ray Image Processing and Registration for Computer-Aided Orthopedic Surgery", Ziv Yaniv
4. EP 08 156 293.6
5. U.S. 61/054,187

Shape representatives represent a characteristic aspect of the shape of an anatomical structure. Examples of shape representatives include straight lines, planes and geometric figures. Geometric figures can be one-dimensional such as for example axes or circular arcs, two-dimensional such as for example polygons and circles, or three-dimensional such as for example cuboids, cylinders and spheres. The relative position between the shape representatives can be described in reference systems, for example by co-ordinates or vectors, or can be described by geometric variables such as for example length, angle, area, volume and proportions. The characteristic aspects which are represented by the shape representatives are for example symmetry properties which are represented for example by a plane of symmetry. Another example of a characteristic aspect is the direction of extension of the anatomical structure, which is for example represented by a longitudinal axis. Another example of a characteristic aspect is the cross-sectional shape of an anatomical structure, which is for example represented by an ellipse. Another example of a characteristic aspect is the surface shape of a part of the anatomical structure, which is for example represented by a plane or a hemisphere. For example, the characteristic aspect constitutes an abstraction of the actual shape or an abstraction of a property of the actual shape (such as for example its symmetry properties or longitudinal extension). The shape representative for example represents this abstraction.

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data.

The atlas data comprises positional information which can be matched (for example by applying an elastic or rigid image fusion (registration) algorithm) for example to positional information contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects.

The movements of the treatment body parts are for example due to movements which are referred to in the following as "vital movements". Reference is also made in this respect to EP 2 189 943 A1 and EP 2 189 940 A1, also published as US 2010/0125195 A1 and US 2010/0160836 A1, respectively, which discuss these vital movements in detail. In order to determine the position of the treatment body parts, analytical devices such as x-ray devices, CT devices or MRT devices are used to generate analytical images (such as x-ray images or MRT images) of the body. For example, analytical devices are constituted to perform medical imaging methods.

Analytical devices for example use medical imaging methods and are for example devices for analysing a patient's body, for instance by using waves and/or radiation and/or energy beams, for example electromagnetic waves and/or radiation, ultrasound waves and/or particles beams. Analytical devices are for example devices which generate images (for example, two-dimensional or three-dimensional images) of the patient's body (and for example of internal structures and/or anatomical parts of the patient's body) by analysing the body. Analytical devices are for example used in medical diagnosis, for example in radiology. However, it can be difficult to identify the treatment body part within the analytical image. It can for example be easier to identify an indicator body part which correlates with changes in the position of the treatment body part and for example the movement of the treatment body part. Tracking an indicator body part thus allows a movement of the treatment body part to be tracked on the basis of a known correlation between the changes in the position (for example the movements) of the indicator body part and the changes in the position (for example the movements) of the treatment body part. As an alternative to or in addition to tracking indicator body parts, marker devices (which can be used as an indicator and thus referred to as "marker indicators") can be tracked using marker detection devices. The position of the marker indicators has a known (predetermined) correlation with (for example, a fixed relative position relative to) the position of indicator structures (such as the thoracic wall, for example true ribs or false ribs, or the diaphragm or intestinal walls, etc.) which for example change their position due to vital movements.

The present application also relates to the field of controlling a treatment beam. The treatment beam treats body parts which are to be treated and which are referred to in the following as "treatment body parts". These body parts are for example parts of a patient's body, i.e. anatomical body parts.

The present application relates to the field of medicine and for example to the use of beams, such as radiation beams, to treat parts of a patient's body, which are therefore also referred to as treatment beams. A treatment beam treats body parts which are to be treated and which are referred to in the following as "treatment body parts". These body parts are for example parts of a patient's body, i.e. anatomical body parts. Ionising radiation is for example used for the purpose of treatment. For example, the treatment beam comprises or consists of ionising radiation. The ionising radiation comprises or consists of particles (for example, sub-atomic particles or ions) or electromagnetic waves which are energetic enough to detach electrons from atoms or molecules and so ionise them. Examples of such ionising radiation include x-rays, high-energy particles (high-energy particle beams) and/or ionising radiation emitted from a radioactive element. The treatment radiation, for example the treatment beam, is for example used in radiation therapy or radiotherapy, such as in the field of oncology. For treating cancer in particular, parts of the body comprising a pathological structure or tissue such as a tumour are treated using ionising radiation. The tumour is then an example of a treatment body part.

The treatment beam is preferably controlled such that it passes through the treatment body part. However, the treatment beam can have a negative effect on body parts outside the treatment body part. These body parts are referred to here as "outside body parts". Generally, a treatment beam has to pass through outside body parts in order to reach and so pass through the treatment body part.

Reference is also made in this respect to the following web pages: http://www.elekta.com/healthcare_us_elekta_vmat.php and http://www.varian.com/us/oncology/treatments/treatment_techniques/rapidarc.

A treatment body part can be treated by one or more treatment beams issued from one or more directions at one or more times. The treatment by means of the at least one treatment beam thus follows a particular spatial and temporal pattern. The term "beam arrangement" is then used to cover the spatial and temporal features of the treatment by means of the at least one treatment beam. The beam arrangement is an arrangement of at least one treatment beam.

The "beam positions" describe the positions of the treatment beams of the beam arrangement. The arrangement of beam positions is referred to as the positional arrangement. A beam position is preferably defined by the beam direction and additional information which allows a specific location, for example in three-dimensional space, to be assigned to the treatment beam, for example information about its co-ordinates in a defined co-ordinate system. The specific location is a point, preferably a point on a straight line. This line is then referred to as a "beam line" and extends in the beam direction, for example along the central axis of the treatment beam. The defined co-ordinate system is preferably defined relative to the treatment device or relative to at least a part of the patient's body. The positional arrangement comprises and for example consists of at least one beam position, for example a discrete set of beam positions (for example, two or more different beam positions), or a continuous multiplicity (manifold) of beam positions.

For example, one or more treatment beams adopt(s) the treatment beam position(s) defined by the positional arrangement simultaneously or sequentially during treatment (for example sequentially if there is only one beam source to emit a treatment beam). If there are several beam sources, it is also possible for at least a subset of the beam positions to be adopted simultaneously by treatment beams during the treatment. For example, one or more subsets of the treatment beams can adopt the beam positions of the positional arrangement in accordance with a predefined sequence. A subset of treatment beams comprises one or more treatment beams. The complete set of treatment beams which comprises one or more treatment beams which adopt(s) all the beam positions defined by the positional arrangement is then the beam arrangement.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT), as mentioned by Wikipedia.

The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data. The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, such as a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

In particular, the invention does not involve or in particular comprise or encompass an invasive step which would represent a substantial physical interference with the body requiring professional medical expertise to be carried out and entailing a substantial health risk even when carried out with the required professional care and expertise. For example, the invention does not comprise a step of positioning a medical implant in order to fasten it to an anatomical structure or a step of fastening the medical implant to the anatomical structure or a step of preparing the anatomical structure for having the medical implant fastened to it. More particularly, the invention does not involve or in particular comprise or encompass any surgical or therapeutic activity. The invention is instead directed as applicable to positioning a tool relative to the medical implant, which may be outside the patient's body. For this reason alone, no surgical or therapeutic activity and in particular no surgical or therapeutic step is necessitated or implied by carrying out the invention.

DESCRIPTION OF THE FIGURES

In the following, the invention is described with reference to the appended figures which represent a specific embodiment of the invention. The scope of the invention is however not limited to the specific features disclosed in the context of the figures, wherein

FIG. 3a is an MR image along a sagittal plane of an anatomical structure indicating a gross tumor volume and a safety margin;

FIG. 3b is an MR image along a coronal plane of an anatomical structure indicating a gross tumor volume and a safety margin;

FIG. 4a is an MR image along a sagittal plane of an anatomical structure indicating a gross tumor volume, a safety margin and a clinical target volume;

FIG. 4b is an MR image along a coronal plane of an anatomical structure indicating a gross tumor volume, a safety margin and a clinical target volume;

FIG. 5a is fractional anisotropy mapping along a sagittal plane of an anatomical structure indicating a gross tumor volume, a safety margin and a clinical target volume;

FIG. 5b is fractional anisotropy mapping along a coronal plane of an anatomical structure indicating a gross tumor volume, a safety margin and a clinical target volume.

FIG. 1 is a flow diagram illustrating the basic steps of the disclosed method which in the illustrative example of FIG. 1 starts with a step S1 of acquiring first image data describing at least one image of an anatomical structure of a patient. Then, step S2 is executed, which encompasses acquiring second image data describing an indicator for a preferred spreading direction or probability distribution of at least one target cell. In subsequent step S3 registration data describing a registration of the first image data to the second image data is determined. In step S4 gross target region data is determined. Subsequently, margin region data is determined in step S5. The last step shown in FIG. 1 is step S6, which is directed to determining clinical target volume data based on the registration data, the gross target region data and the margin region data.

FIG. 2 shows an exemplary system for performing the disclosed method. The system comprises a computer 2 as well as a medical imaging device 8 operably coupled to the computer 2. The computer 2 comprises a processor 3, a memory 4 and an interface 5. The computer 2 is connected to an input unit 6, such as a mouse, a keyboard or a touch-sensitive surface, and an output unit 7 such as a display, a speaker or a tactile sensation generation unit. A program causing the computer 2 to perform the disclosed method may be loaded into the memory 4 of the computer. In one embodiment the program may be stored on a program storage medium comprised in or connected to the computer 2. Furthermore, the computer 2 may be operably coupled to at least one electronic data storage device for storing atlas data.

FIGS. 3a and 3b depict MR images along the sagittal and the coronal plane of an anatomical structure, respectively. A gross tumor volume (GTV) is surrounded by a 6 mm safety margin (line hatch). FIGS. 4a and 4b additionally indicate an optimized clinical target volume (cross hatch) determined according to the disclosed method is depicted in FIGS. 4a and 4b.

FIGS. 5a and 5b depict fractional anisotropy (FA) mappings along a saggital plane and the coronal plane, respectively. The gross tumor volume (GTV), the safety margin (line hatch) and the clinical target volume (cross hatch) are overlaid on the respective fractional anisotropy (FA) mappings.

Figure 1:
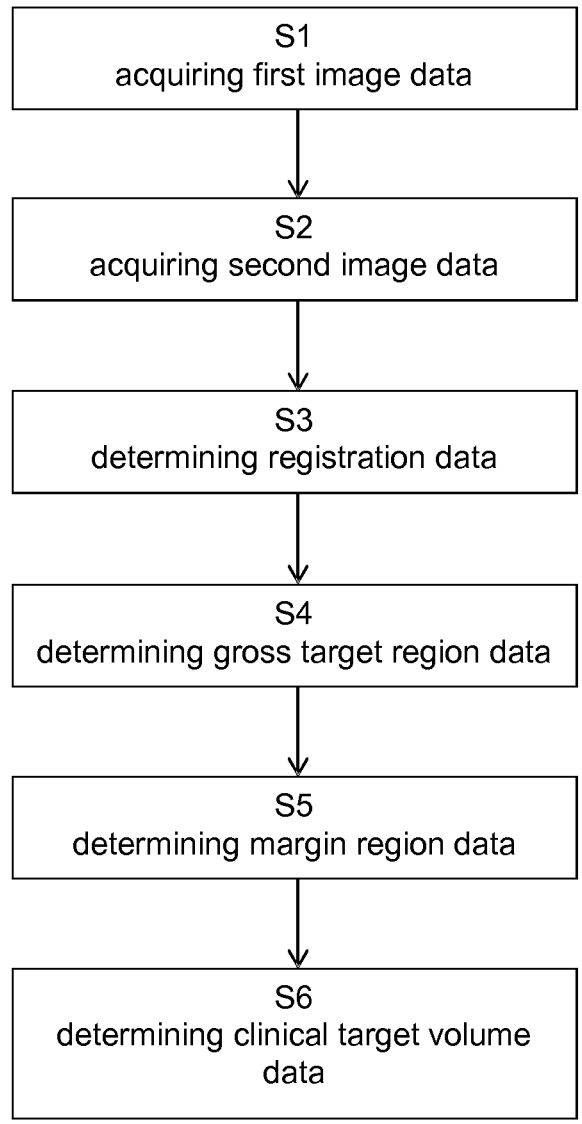
FIG. 1 is a flow diagram showing the basic steps of the disclosed method.
Figure 2:
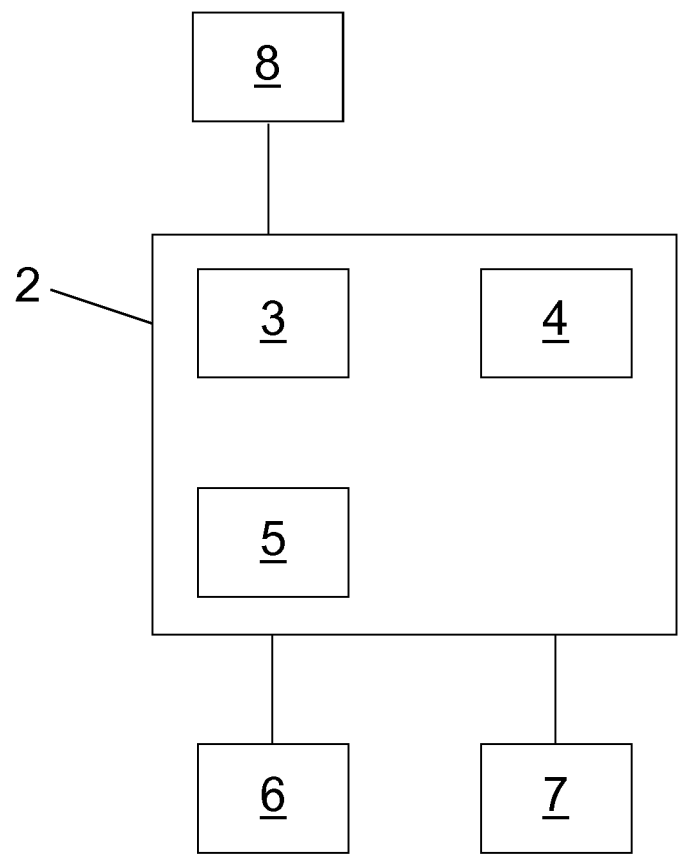
FIG. 2 is a schematic view of a system performing the disclosed method.

The invention claimed is:

1. An image processing method for determining a clinical target volume for a medical treatment, wherein the method comprises executing, on at least one processor of at least one computer, the steps of:
    acquiring first image data describing at least one image of an anatomical structure of a patient;
    acquiring second image data describing an indicator for a preferred spreading direction or probability distribution of a position of at least one target cell;
    determining registration data describing a registration of the first image data to the second image data by performing a co-registration between the first image data and the second image data using a registration algorithm;
    determining gross target region data describing a target region in the at least one image of the anatomical structure based on the first image data;
    determining margin region data describing a margin around the target region based on the gross target region data;
    determining clinical target volume data describing a volume in the anatomical structure for the medical treatment based on the registration data, the gross target region data and the margin region data,
    determining an optimized target volume based at least on the second image data,
    wherein the volume described by the clinical target volume data comprises the target region plus the margin;
    acquiring threshold data describing at least one threshold for a value described by the second image data,
    wherein determining the optimized clinical target volume data is further based on the threshold data for the target region plus the margin, wherein the optimized clinical target volume data is generated automatically.

2. The method according to claim 1, wherein determining the gross target region data comprises segmentation of the first image data.

3. The method according to claim 1, wherein determining margin region data comprises computing safety margin distance data describing a distance from a specified point of the target region by means of a distance function.

4. The method according to claim 1, comprising executing, on the at least one processor of the at least one computer, a step of:
    acquiring threshold data describing at least one threshold for a value described by the second image data, wherein determining the clinical target volume data is further based on the threshold data.

5. The method according to claim 1, wherein the target region comprises the position of at least one tumor cell or at least one infected cell within the anatomical structure.

6. The method according to claim 1, wherein the second image data is acquired by diffusion tensor imaging, diffusion kurtosis imaging, diffusion weighted imaging, diffusion spectrum imaging, perfusion weighted imaging, positron emission tomography or single-photon emission computed tomography.

7. The method according to claim 1, wherein the medical treatment is a radiation treatment.

8. A non-transitory computer-readable program storage medium having instructions for determining a clinical target volume for a medical treatment, comprising:
    computer instructions which when running on at least one processor of at least one computer causes the at least one processor to:
    acquire first image data describing at least one image of an anatomical structure of a patient;
    acquire second image data describing an indicator for a preferred spreading direction or probability distribution of a position of at least one target cell;
    determine registration data describing a registration of the first image data to the second image data by performing a co-registration between the first image data and the second image data using a registration algorithm;
    determine gross target region data describing a target region in the at least one image of the anatomical structure based on the first image data;
    determine margin region data describing a margin around the target region based on the gross target region data;
    determine clinical target volume data describing a volume in the anatomical structure for the medical treatment based on the registration data, the gross target region data and the margin region data;
    determining an optimized target volume based at least on the second image data;
    wherein the volume described by the clinical target volume data comprises the target region plus the margin;
    acquiring threshold data describing at least one threshold for a value described by the second image data,
    wherein determining the optimized clinical target volume data is further based on the threshold data for the target region plus the margin, wherein the optimized clinical target volume data is generated automatically.

9. At least one computer, comprising:
    at least one processor and at least one memory, the memory having instructions stored thereon which when executed by the at least one processor cause the at least one processor to:
    acquire first image data describing at least one image of an anatomical structure of a patient;
    acquire second image data describing an indicator for a preferred spreading direction or probability distribution of a position of at least one target cell;

determine registration data describing a registration of the first image data to the second image data by performing a co-registration between the first image data and the second image data using a registration algorithm;

determine gross target region data describing a target region in the at least one image of the anatomical structure based on the first image data;

determine margin region data describing a margin around the target region based on the gross target region data;

determine clinical target volume data describing a volume in the anatomical structure for a medical treatment based on the registration data, the gross target region data and the margin region data;

determining an optimized target volume based at least on the second image data, wherein the volume described by the clinical target volume data comprises the target region plus the margin;

acquiring threshold data describing at least one threshold for a value described by the second image data, wherein determining the optimized clinical target volume data is further based on the threshold data for the target region plus the margin, wherein the optimized clinical target volume data is generated automatically.

10. A system for determining a clinical target volume for a medical treatment, the system comprising:

at least one medical imaging device for acquiring image data;

at least one computer having at least one processor and associated memory, the memory having instructions stored thereon which when executed by the at least one processor cause the at least one processor to:

acquire first image data describing at least one image of an anatomical structure of a patient;

acquire second image data describing an indicator for a preferred spreading direction or probability distribution of a position of at least one target cell;

determine registration data describing a registration of the first image data to the second image data by performing a co-registration between the first image data and the second image data using a registration algorithm;

determine gross target region data describing a target region in the at least one image of the anatomical structure based on the first image data;

determine margin region data describing a margin around the target region based on the gross target region data;

determine clinical target volume data describing a volume in the anatomical structure for the medical treatment based on the registration data, the gross target region data and the margin region data;

determining an optimized target volume based at least on the second image data, wherein the volume described by the clinical target volume data comprises the target region plus the margin;

acquiring threshold data describing at least one threshold for a value described by the second image data, wherein determining the optimized clinical target volume data is further based on the threshold data for the target region plus the margin, wherein the optimized clinical target volume is generated automatically, wherein the at least one computer is operably coupled to the at least one medical imaging device for acquiring, from the at least one medical imaging device, the first image data and/or the second image data.

* * * * *